(12) United States Patent
Lelkes

(10) Patent No.: US 7,145,303 B2
(45) Date of Patent: Dec. 5, 2006

(54) METHOD FOR THE COMMUTATION OF A BRUSHLESS DIRECT CURRENT MOTOR

(75) Inventor: András Lelkes, Bad Dürrheim (DE)

(73) Assignee: Minebea Co. Ltd., Nagano-ken (JP)

( * ) Notice: Subject to any disclaimer, the term of this patent is extended or adjusted under 35 U.S.C. 154(b) by 161 days.

(21) Appl. No.: 10/852,369

(22) Filed: May 24, 2004

(65) Prior Publication Data

US 2005/0007051 A1 Jan. 13, 2005

(30) Foreign Application Priority Data

Jun. 13, 2003 (DE) ................. 103 26 606

(51) Int. Cl.
*H02P 7/50* (2006.01)
(52) U.S. Cl. ................ 318/439; 318/430; 318/434
(58) Field of Classification Search ............. 318/254, 318/439, 723, 727, 778, 800, 801
See application file for complete search history.

(56) References Cited

U.S. PATENT DOCUMENTS

| | | | | |
|---|---|---|---|---|
| 3,659,168 A | * | 4/1972 | Salihi et al. ............. | 318/800 |
| 4,276,504 A | | 6/1981 | Nagase et al. ........... | 318/721 |
| 4,565,957 A | * | 1/1986 | Gary et al. .............. | 318/723 |
| 4,574,340 A | * | 3/1986 | Baker ...................... | 363/41 |
| 5,229,698 A | * | 7/1993 | Minnich et al. ......... | 318/568.15 |
| 5,457,374 A | * | 10/1995 | Branecky et al. ........ | 318/801 |
| 5,530,326 A | * | 6/1996 | Galvin et al. ............ | 318/254 |
| 5,739,651 A | * | 4/1998 | Miyazawa et al. ....... | 318/439 |
| 5,808,440 A | * | 9/1998 | Bennett et al. .......... | 318/778 |
| 6,703,449 B1 | * | 3/2004 | Hoxmeier et al. ....... | 525/314 |
| 6,717,380 B1 | | 4/2004 | Sutter et al. ............. | 318/254 |
| 6,949,908 B1 | * | 9/2005 | Maslov et al. ........... | 318/727 |

FOREIGN PATENT DOCUMENTS

| | | |
|---|---|---|
| DE | 28 56 538 | 8/1979 |
| DE | 38 35 030 | 4/1990 |
| DE | 695 23 134 | 11/1994 |
| DE | 38 19 064 | 5/1995 |
| DE | 199 55 248 | 5/2001 |

* cited by examiner

*Primary Examiner*—Paul Ip
(74) *Attorney, Agent, or Firm*—Baker & Daniels

(57) ABSTRACT

The invention relates to a method for the commutation of a brushless direct current motor in which the position of the rotor in respect of the stator is determined directly or indirectly and an external operating voltage is applied, at a preset commutation angle, to the at least one motor winding depending on the determined rotor position. In accordance with the invention, the motor is preferably switched periodically back and forth between a second optimized commutation angle and the first, original, preset commutation angle. If a change in rotational speed results from switching between the commutation angles, the new operating point deviates from the old operating point. To compensate for this difference in speed, not only is the pre-commutation angle changed but the motor voltage is also changed.

20 Claims, 3 Drawing Sheets

METHOD FOR THE COMMUTATION OF A BRUSHLESS DIRECT CURRENT MOTOR

The invention relates to a method for the commutation of a brushless direct current motor in which the position of the rotor in respect of the stator is determined directly or indirectly and an external operating voltage is applied, at a preset commutation angle, to the at least one motor winding depending on the determined rotor position.

In a brushless DC motor, the motor voltage or the motor current is electronically commutated in specific positions of the rotor. In a single-phase motor this occurs two times per electric rotation. In a three-phase motor, a power switch is switched off every 120° (electric) and another is switched on. To ensure that this commutation process takes place at the correct point in time, the current position of the motor has to be known. For these motors, a usual method of registering the position of the motor is by using Hall sensors. These elements measure the magnetic field generated by the permanent magnet rotor.

Since the motor winding has relatively high inductivity, a certain time is needed for the commutation of the motor current, this means that the current is delayed. To compensate for this delay, pre-commutation is carried out. This means that the commutation process is started earlier, before the rotor has reached the neutral position or the theoretical commutation position. There are two ways of doing this. One way is for the Hall sensor not to be placed in the neutral zone but rather in a position deviating slightly from it. This is only possible, however, for motors which only need to turn in one direction (e.g. fans). The disadvantage of this method is that here the stator current can influence the measurement signal of the Hall sensor which can lead to start-up difficulties, among others.

Another method makes use of the fact that these motors, together with their load, have a high moment of inertia, particularly in fan applications. Because of this, the operating speed changes relatively slowly which is why the time between two changes in polarity in the Hall signal are measured. If we assume that the time between the next two changes in polarity remains constant, then pre-commutation can be controlled by means of a timer component. This timer can either take the form of a hardware component, e.g. the counter/timer unit of a micro-controller, or be realized in software form. The advantage of this method is that the Hall sensor can be placed in the neutral zone where, due to reasons of symmetry, the influence of the winding current on the sensor is minimal. The disadvantage is the slight increase in requirements placed on the control electronics, e.g. a more sophisticated micro-controller.

Commutation timing can also be determined without using Hall sensors or position sensors in general. In these sensor-less motors, the motor windings are used as sensors. This method is particularly advantageous for motors with external commutation electronics since here not only the sensors and their supports in the motor, if any, can be omitted, but also the sensor leads to the external electronics and the related plugs.

Irrespective of how the rotor position is measured and how pre-commutation is realized, the question remains as to how large the angle of pre-commutation need be. Both the torque-speed characteristic as well as the motor efficiency can be influenced by this angle. In specific cases, even the acoustic noise can be improved when the commutation angle is set appropriately.

If the angle of pre-commutation of a motor operating without a speed control is changed in order to optimize certain properties, such as efficiency, this results in a change in the torque-speed characteristic. Taking the case of a fan, however, this means that it operates at a different operating point than it would without optimization, so that its rotational speed and thus the air flow changes. We often wish to improve the properties of the motor, however, without changing the torque-speed characteristic.

The object of the invention is thus to provide a method for the commutation of a brush less DC motor in which the operating properties of the motor can be improved without the torque-speed characteristic (operating point) being significantly changed.

This object has been achieved in accordance with the invention by the method revealed in claim 1.

Beneficial embodiments and further developments of the method are provided in the subsidiary claims.

In accordance with the invention, the motor is operated in two modes of operation in which it preferably switches periodically back and forth between a first mode of operation with the original, preset commutation angle and a second mode of operation with a second, optimized commutation angle. If a change in rotational speed results from switching between the original and the new commutation angle, the new operating point deviates from the old operating point. To compensate for this speed deviation, not only is the pre-commutation angle changed, the motor voltage is also changed in such a way that even when operating with the new commutation angle, the motor operates with the same rotational speed, that is at the original operating point.

If the rotational speed is less with the optimized commutation angle than with the preset commutation angle, then when operating with the optimized commutation angle, the motor voltage has to be increased, for example, by changing the pulse-width ratio (PWM ratio) of the motor voltage. The time period during which the motor operates with the preset angle (reference angle) is relatively short compared to the length of time it operates with the optimized angle. This means that average efficiency is not significantly influenced or made worse by the periodic switching. The period of operation with the preset angle must, however, be long enough to allow the change in speed to be measured correctly. After a specific number of rotations or a given period of time, each second for example, it is thus sufficient to switch briefly, for the duration of one rotation for example, from the second to the first mode of operation in order to measure the rotational speed, which may have changed due to a change of load or changes in the surrounding conditions. The motor can then immediately switch again to the second mode of operation.

The rotational speed can be measured from the commutation signal (e.g. Hall signal) without the need for extra sensors. To compare rotational speeds, it is also sufficient to measure the times between two polarity changes in the commutation process. These times can then be directly compared, with longer times naturally meaning a lower rotational speed.

The method presented in the invention allows the operating behavior of the motor to be optimized in terms, for example, of power consumption, efficiency or operating noise. At the same time, however, the operating point remains unchanged in the second mode of operation so that this optimization can even be introduced into existing products. In many cases, such improvement can be made without changing the hardware, that is without incurring any extra costs.

A simple embodiment of the invention is explained below on the basis of several drawings.

Figure 1:
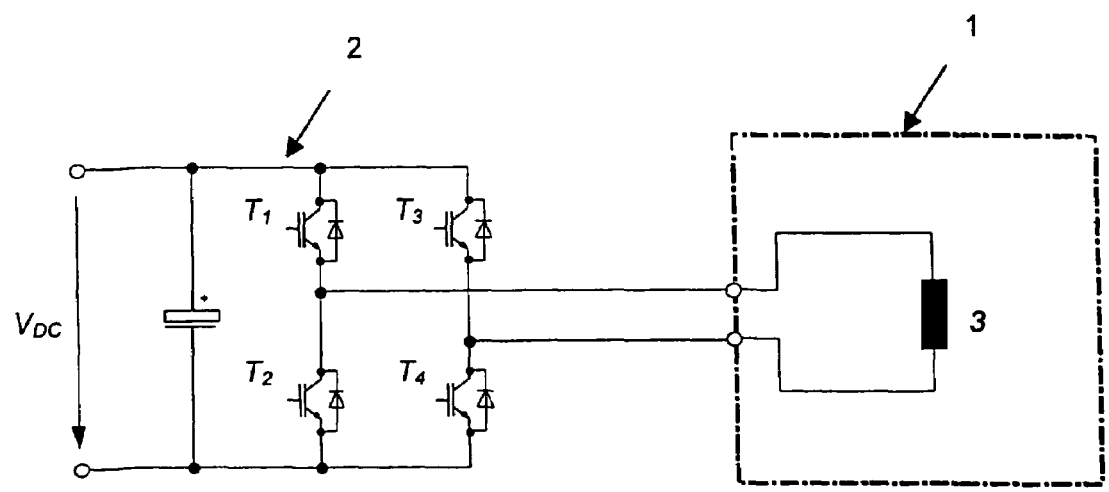
FIG. 1 shows a block diagram of a single-phase, brushless DC motor.

FIG. 1 shows a simplified block diagram of a single-phase, brushless DC motor. The motor comprises the actual motor 1 as well as the associated motor control 2, which can be integrated into the motor or also provided externally. The single winding 3 of the rotor is energized for an electrical angle of 180° each time, that means that after 180° the polarity of the supply voltage $V_{DC}$ is switched by the transistors $T_1$ to $T_4$ of the control 2. Single-phase, brushless DC motors of this kind are used, for example, to drive fans.

Figure 2:
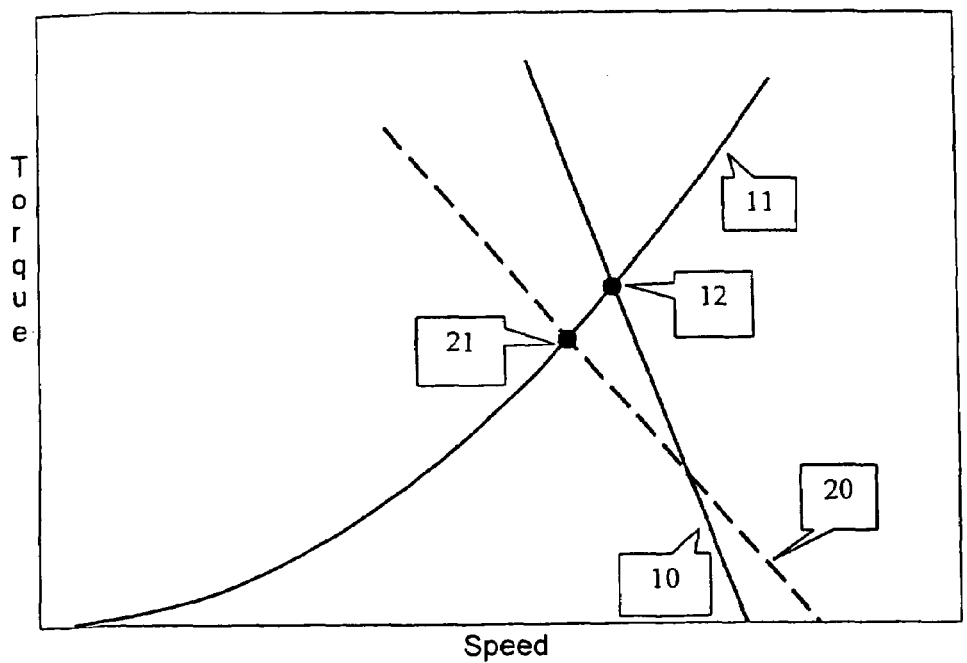
FIG. 2 shows a torque-speed characteristic of a DC motor to drive a fan when the commutation angle is changed.

FIG. 2 shows the characteristic of such a DC motor operating as a fan. Here, the torque is plotted against the rotational speed. The motor characteristic at a specific operating voltage is represented by "10". The motor characteristic 10 intersects a corresponding load characteristic 11 of the fan at operating point 12, representing the regular, preset operating point.

Figure 3A:
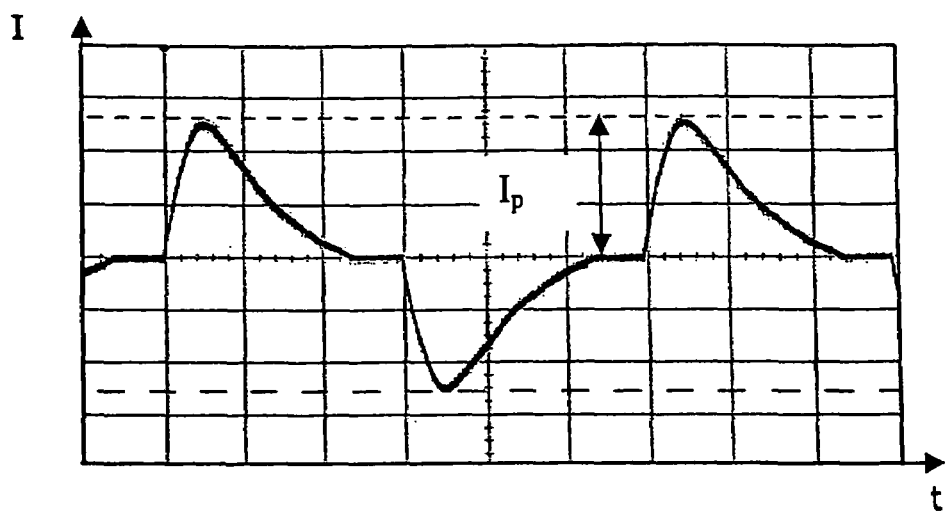
FIGS. 3a, 3b and 3c show the waveform of the stator current of a motor to drive a fan at various commutation angles.
Figure 3B:
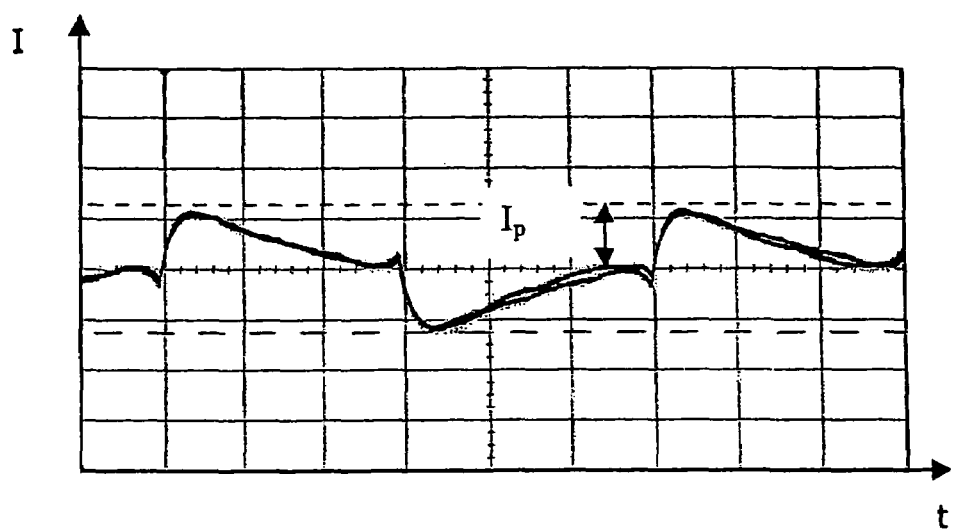
Figure 3C:
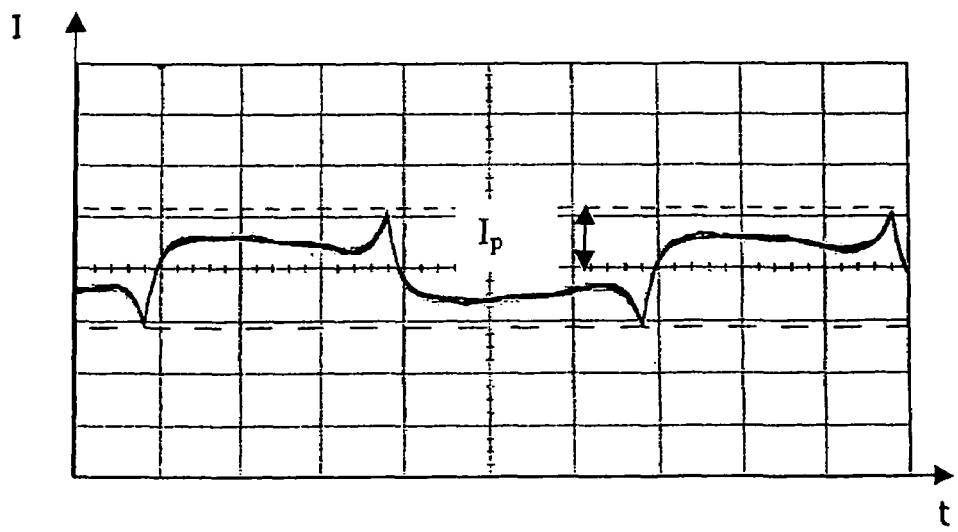

FIG. 3a shows, for example, the waveform of the winding current at operating point 12 in FIG. 2. A complete commutation cycle is illustrated which corresponds to one rotation of motor 1. It is possible to recognize the relatively large peak current lp which occurs for the selected operating point 12 and the commutation times illustrated. If the commutation time, that means also the commutation angle, were to be shifted forward by a certain amount of time, for example, this would strongly influence the stator current, both its waveform as well as its effective value and peak value, represented here as peak current lp. This would also change the motor characteristic and thus the efficiency of the motor. This forward shift of the commutation angle is illustrated in FIGS. 3b and 3c.

If a change in the commutation angle is now assumed, the characteristic of the motor will also change, with the original characteristic 10 of the motor moving to the new characteristic 20, resulting in a new operating point 21 on the load characteristic 11 of the fan. At the same time, the rotational speed of the motor declines, as can be seen in the diagram in FIG. 2. This situation is counteracted in accordance with the invention in that the commutation angle is changed periodically, that is it is switched between the two operating points 12 and 21. In each operating point 12 or 21, the current speed is measured and the target speed at operating point 12 is compared to the speed at operating point 21. It can be seen from FIG. 2, that the speed at operating point 21 is less than the speed at operating point 12. To make it possible for the motor to operate in the original operating point 12 in the second mode of operation as well, that is when the commutation angle has changed, the voltage at the winding 3 is increased in accordance with the invention until the corresponding target speed has again been achieved.

Figure 4:
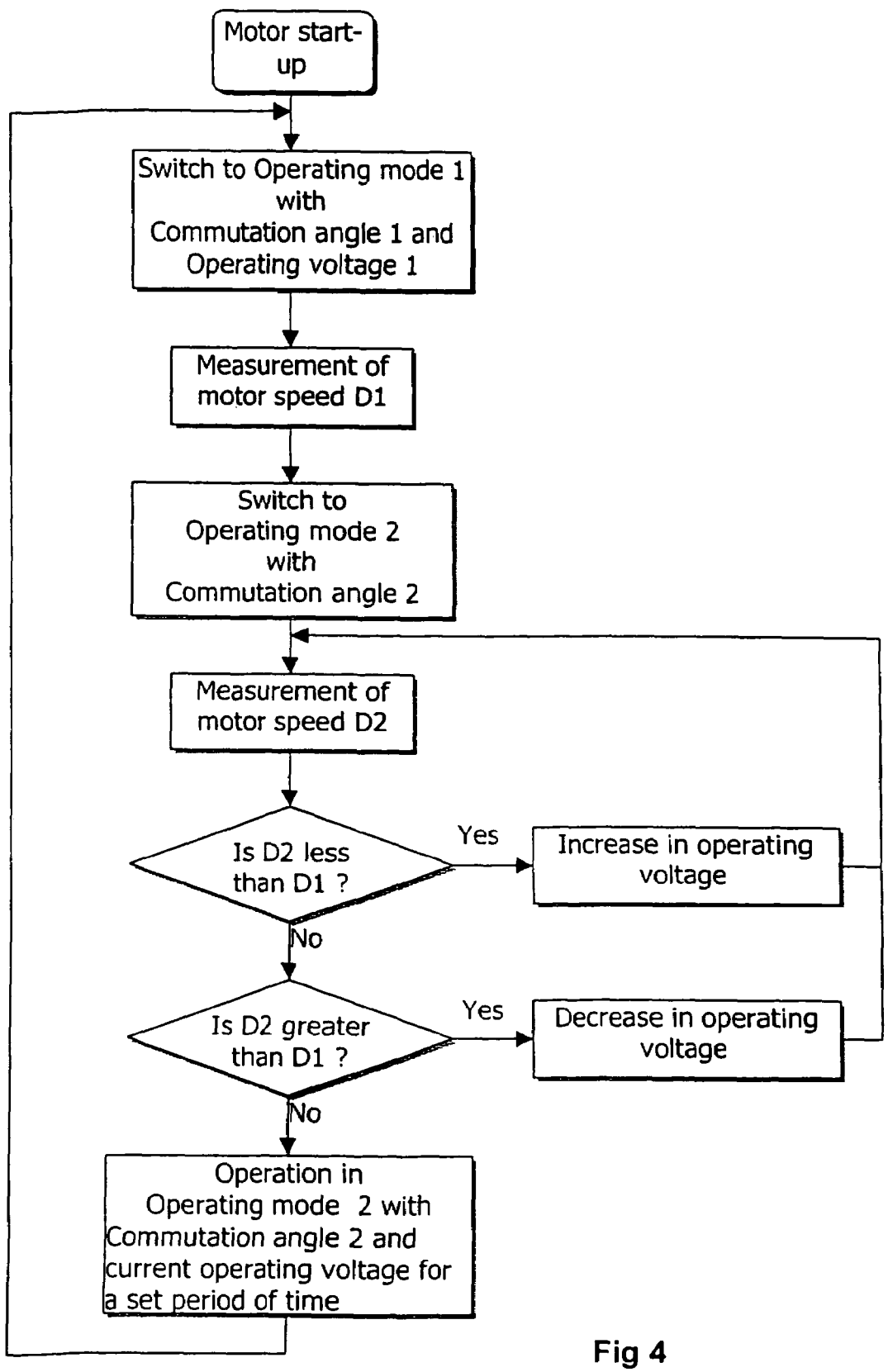
FIG. 4 shows a flow chart of the method according to the invention.

FIG. 4 shows a flow chart of the method presented in the invention as can be carried out by a motor control 2. The motor initially starts up in the first mode of operation, corresponding to a first commutation angle and a first operating voltage. In the next step, the motor speed D1 is measured. Then a switch to the second mode of operation takes place, corresponding to a second commutation angle. The current speed D2 is again measured in the second mode of operation. The measured speeds D1 and D2 are compared to each other. If D2 is less than D1, the operating voltage is increased until the two speeds match. If D2 is greater than D1, the operating voltage is reduced until the two speeds match. Afterwards, the motor is operated in the second mode of operation for a set time, that is with the second commutation angle and the current operating voltage until a switch is again made to the first mode of operation and the process begins again from the start.

The invention claimed is:

1. A method for the commutation of a brushless direct current motor, the motor including a rotor, a stator, and at least one motor winding, in which the position of the rotor in respect of the stator is determined, and an external operating voltage is applied, at a preset commutation angle, to the at least one motor winding depending on the determined rotor position, the method comprising the steps of:
   initially operating the motor in a first mode of operation with a preset commutation angle and a first operating voltage;
   measuring the rotational speed of the motor in the first mode of operation;
   switching from the first mode of operation to a second mode of operation with a changed commutation angle;
   operating the motor in the second mode of operation;
   measuring the rotational speed of the motor in the second mode of operation;
   comparing the rotational speed of the motor measured in the first mode of operation with the rotational speed of the motor measured in the second mode of operation; and
   changing the operating voltage in such a way that the rotational speed in the second mode of operation matches the rotational speed in the first mode of operation if there is a deviation between the rotational speed of the motor measured in the first mode of operation and the rotational speed of the motor measured in the second mode of operation.

2. The method according to claim 1, wherein after a set number of motor rotations or a set period of time, the motor is briefly switched to the first mode of operation in order to once more measure the rotational speed of the motor.

3. The method according to claim 1, wherein a length of operation in the second mode of operation is many times greater than a length of operation in the first mode of operation.

4. The method according to claim 1, wherein the operating voltage is increased if a decline in rotational speed is detected in the second mode of operation.

5. The method according to claim 1, wherein the operating voltage is reduced if an increase in rotational speed is detected in the second mode of operation.

6. The method according to claim 1, wherein the respective rotational speed of the motor is determined from the time difference between two commutation times.

7. The method according to claim 1, wherein the method is used to control the commutation of a brushless direct current motor used for propelling a fan.

8. A device for the electronic control of the commutation of a brushless DC motor comprising:
   means for switching the motor from a first mode of operation, corresponding to a first commutation angle, to a second mode of operation, corresponding to a second commutation angle;
   means for measuring a rotational speed of the motor during operation in the first and second modes of operation respectively;

means for comparing the two measured rotational speeds; and means for changing an operating voltage applied to the motor to compensate for a change between the rotational speed occurring in the second mode of operation and the rotational speed occurring in the first mode of operation.

9. The method according to claim 2, wherein a length of operation in the second mode of operation is many times greater than a length of operation in the first mode of operation.

10. The method according to claim 2, wherein the operating voltage is increased if a decline in rotational speed is detected in the second mode of operation.

11. The method according to claim 3, wherein the operating voltage is increased if a decline in rotational speed is detected in the second mode of operation.

12. The method according to claim 2, wherein the operating voltage is reduced if an increase in rotational speed is detected in the second mode of operation.

13. The method according to claim 3, wherein the operating voltage is reduced if an increase in rotational speed is detected in the second mode of operation.

14. The method according to claim 2, wherein the respective rotational speed of the motor is determined from the time difference between two commutation times.

15. The method according to claim 3, wherein the respective rotational speed of the motor is determined from the time difference between two commutation times.

16. The method according to claim 4, wherein the respective rotational speed of the motor is determined from the time difference between two commutation times.

17. The method according to claim 5, wherein the respective rotational speed of the motor is determined from the time difference between two commutation times.

18. The method according to claim 2, wherein the method is used to control the commutation of a brushless direct current motor used for propelling a fan.

19. The method according to claim 3, wherein the method is used to control the commutation of a brushless direct current motor used for propelling a fan.

20. The method according to claim 4, wherein the method is used to control the commutation of a brushless direct current motor used for propelling a fan.

* * * * *